July 1, 1930.　　　E. T. PEARSONS　　　1,769,544
VEHICLE
Filed Dec. 12, 1928　　　2 Sheets-Sheet 2
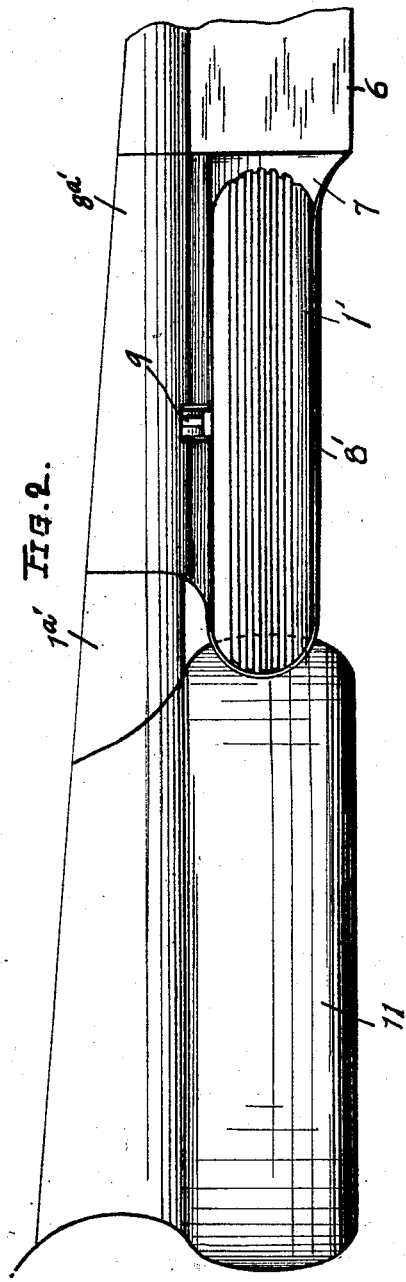
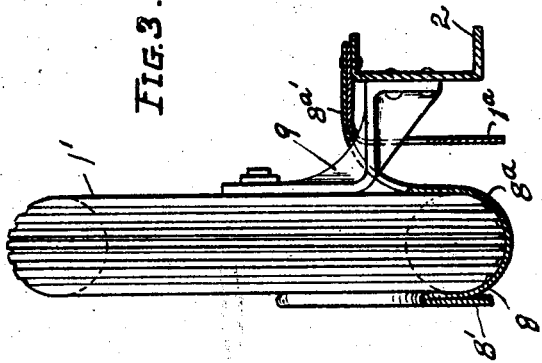
INVENTOR
Ernest T. Pearsons
BY
Geo. B. Pitt
ATTORNEY Patented July 1, 1930

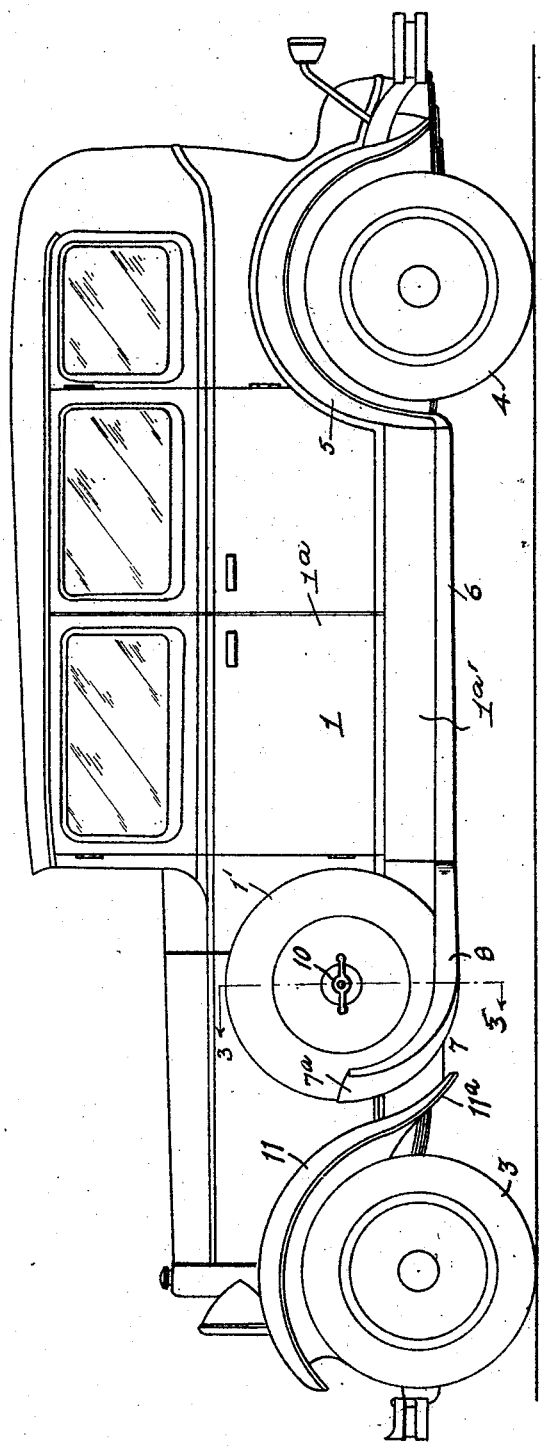

1,769,544

UNITED STATES PATENT OFFICE

ERNEST T. PEARSONS, OF CLEVELAND, OHIO, ASSIGNOR TO THE BAKER-RAULANG COMPANY, OF CLEVELAND, OHIO, A CORPORATION OF OHIO

VEHICLE

Application filed December 12, 1928. Serial No. 325,436.

This invention relates to a vehicle construction, more particularly of the self-driven type.

The object of the invention is to provide in a vehicle body an improved fender, running board and tire carrier, whereby the latter is positioned out of the path of splashings from the front vehicle wheel and provision is made for draining water gravitating or flowing off the front fender instead of conducting it to the running board.

Another object of the invention is to provide in a vehicle body an improved fender, running board and tire carrier that is economical in construction and readily assembled.

Other objects will be apparent to those skilled in the art to which my invention relates from the following description taken in connection with the accompanying drawings, wherein Fig. 1 is a side view of a vehicle embodying my invention.

Fig. 2 is a fragmentary plan view.

Fig. 3 is a section on the line 3—3 of Fig. 1.

In the drawings, 1 indicates as an entirety the vehicle having a frame 2 mounted on wheels 3 and 4. The vehicle body chosen for illustration is of the closed type. The vehicle 1 is of the self-propelled type, and its propulsion may be by means of an electric motor or an internal combustion engine. The driving means, operating devices and other mechanisms are not shown.

5 indicates a fender for the rear wheel 4. 6 indicates the running board extending from the inner terminal end edge of the fender 5 forwardly, preferably to a point approximately in line with or opposite the front vertical edge of the front door $1^a$. 7 indicates a member extending forwardly from the front-end of the running board in the plane thereof and having its forward end portion $7^a$ curved upwardly on an arc struck on a radius equal to the radius of the spare tire or tired wheel $1'$, so that its rear or main portion as well as the running board 6 is substantially tangential thereto. The opposite longitudinal side portions 8, $8^a$ of the member 7 throughout its main and forward end portion $7^a$ are bent upwardly on curved lines to provide a seat corresponding in cross sectional shape to the transverse shape of the spare tire, thereby forming a cradle for the tire and holding it against lateral movement. The outer side portion 8 is doubled back, as shown at $8'$, on itself throughout the length of the member to impart strength and rigidity thereto, to effect a neat and finished side edge and eliminate exposing a rough free edge of metal. The inner longitudinal side portion $8^a$ is extended upwardly and laterally, as shown at $8^{a'}$, so as to be over the splash member $1^{a'}$ and be secured thereto in any desired manner, as by rivets.

Suitable means arranged to co-operate with the carrier or member 7 are provided for securing the spare tire or tired wheel on and in fixed relation to the cradle 7. The form and construction of the securing means will depend upon whether a tire and rim or a tired wheel is carried as the spare. In the illustrated arrangement I have shown a tired wheel $1'$ (already referred to). In this arrangement I secure to the adjacent chassis member 2 a bracket 9 which extends upwardly and outwardly and carries at its upper end a spindle or stud adapted to extend through the hub of the wheel, so that by means of a clamping element 10, removably mounted on the spindle, it may be detachably clamped against the wheel hub. It will of course be understood that the spindle and clamping element 10 will be changed to suit the size and construction of the hub of the wheel to be carried. The inner side portion $8^a$ and the splash member $1^{a'}$ are formed with openings to accommodate the bracket 9, as shown in Fig. 3.

11 indicates the fender for the front wheel 3. As shown, the rear downwardly curved portion of this fender throughout its major portion is concentric to the wheel 3, but its rear terminal portion $11^a$ is curved downwardly and rearwardly in concentric relation to the forward end portion $7^a$ of the carrier 7, but in spaced relation to such portion, so that its free rear or lower end edge is not connected to the carrier or running board 6. As shown, the fender end portion 11ᵃ terminates in a plane coincident with or below the main horizontal portion of the carrier 7.

Where two spare tires or tired wheels are to be carried, the construction of the running board, carrier and front fender on the opposite side of the vehicle may be similar to the construction of these parts shown, so that both sides of the vehicle will be similar. Where but one side of the vehicle embodies my novel features, the running board and front fender on the other side may be of any desired construction.

In vehicle constructions of which I have knowledge where the spare tire or wheel is carried at the forward end of one or both of the running boards, the rearward portion of the front fender has a downwardly extending pocket in which a portion of the spare tire seats. This pocket is visible below the side edge of the front fender and being in the path of the wheel splashings, it becomes coated with dirt and the like and presents an unsightly condition, especially when the remaining portion of the vehicle is clean and polished.

My construction is advantageous since the spare tire carrier is not a part of or incorporated in the front fender and is not therefore countersunk into the fender on its rearward portion, but instead the rear portion of the front fender extends in front of the carrier 7 and hence fully protects it from splashings. Accordingly, the conditions above referred to are entirely eliminated. My construction is also advantageous since the rear terminal end portion of the front fender is spaced and detached from the carrier and adjacent running board. Accordingly, rain and water or other liquid applied for washing purposes drains to the ground instead of to the carrier or running board, and vibrations of the front fender are not transmitted to the tire and its clamping means with tendency to produce rattling of these means or to loosen them.

In my construction the front fender can be carried farther around the rearward portion of the front wheel, the result being that the front wheel fender is more effective and it makes a more symmetrical and balanced eye appearance with respect to the rear wheel fender. Likewise, the member 7 constituting the carrier, being separate from and independent of the front fender, can engage a greater portion of the spare tire; in fact it can be extended around one-half the circumference of the tire, where such construction is found desirable. This symmetrical effect also results from making the opposing portions 7ᵃ, 11ᵃ, curved about the same axis.

To those skilled in the art to which my invention relates many changes in construction and widely differing embodiments and applications of my invention will suggest themselves without departing from the spirit and scope thereof. My disclosures and the description herein are purely illustrative and not intended to be in any sense limiting.

What I claim is:—

1. In a vehicle, the combination with a frame, a body on said frame and front and rear wheels for said frame, of a running board along one side portion of said frame, a member extending forwardly from the front end of said running board, the forward portion of said member being curved upwardly at its front portion to form with the main portion of said member a tire carrier, and a fender for the adjacent front wheel carried by said frame and having its rearward portion extending downwardly in front of the upwardly curved portion of said member and in spaced relation thereto and forming a guard for said member.

2. In a vehicle, the combination with a frame, a body on said frame, front and rear wheels for said frame and a splash member for said frame, of a running board along said splash member, a member extending forwardly from the front end of said board, the forward portion of said member being curved upwardly to form a seat for a tire, and a fender for the adjacent front wheel carried by said frame, the rear portion of said fender extending rearwardly to approximately the level of said running board to form a guard for said member to permit the escape of water on said fender and splash member and exclude water from engagement with the tire.

In testimony whereof I affix my signature.

ERNEST T. PEARSONS.